US012756267B2

(12) United States Patent
Ogata et al.

(10) Patent No.: US 12,756,267 B2
(45) Date of Patent: Oct. 6, 2026

(54) ROTOR, BRUSHLESS MOTOR, AND METHOD FOR MANUFACTURING ROTOR

(71) Applicants: CITIZEN CHIBA PRECISION CO., LTD., Yachiyo (JP); CITIZEN WATCH CO., LTD., Nishitokyo (JP)

(72) Inventors: Kazunari Ogata, Yachiyo (JP); Takehiro Kariya, Yachiyo (JP); Tomohiro Seimiya, Yachiyo (JP); Makoto Doi, Yachiyo (JP); Shougo Kimura, Yachiyo (JP); Akito Takenaka, Yachiyo (JP); Katsumoto Kataoka, Yachiyo (JP)

(73) Assignees: CITIZEN CHIBA PRECISION CO., LTD., Yachiyo (JP); CITIZEN WATCH CO., LTD., Tokyo (JP)

( * ) Notice: Subject to any disclaimer, the term of this patent is extended or adjusted under 35 U.S.C. 154(b) by 557 days.

(21) Appl. No.: 18/038,098

(22) PCT Filed: Dec. 22, 2021

(86) PCT No.: PCT/JP2021/047593
§ 371 (c)(1),
(2) Date: May 22, 2023

(87) PCT Pub. No.: WO2022/138727
PCT Pub. Date: Jun. 30, 2022

(65) Prior Publication Data

US 2023/0412044 A1 Dec. 21, 2023

(30) Foreign Application Priority Data

Dec. 24, 2020 (JP) ................................ 2020-214473
Dec. 24, 2020 (JP) ................................ 2020-215519

(51) Int. Cl.
*H02K 1/22* (2006.01)
*H02K 1/27* (2022.01)
(Continued)

(52) U.S. Cl.
CPC ............ *H02K 7/04* (2013.01); *H02K 15/165* (2013.01)

(58) Field of Classification Search
CPC .......... H02K 1/22; H02K 1/27; H02K 1/2726; H02K 1/28; H02K 5/173; H02K 5/1732;
(Continued)

(56) References Cited

U.S. PATENT DOCUMENTS 4,942,322 A * 7/1990 Raybould ............ H02K 1/2726 29/598
5,121,605 A 6/1992 Oda et al.
(Continued)

FOREIGN PATENT DOCUMENTS

CN 112350505 A * 2/2021 .............. F16C 35/02
DE 102010023813 A1 * 12/2011 ........... H02K 1/2726
(Continued)

OTHER PUBLICATIONS

Mar. 15, 2022 International Search Report issued in International Patent Application No. PCT/JP2021/047593.
(Continued)

*Primary Examiner* — Edgardo San Martin
(74) *Attorney, Agent, or Firm* — Oliff PLC

(57) ABSTRACT

A rotor 10 rotatable around a predetermined centerline direction includes: a columnar magnet 12; and a first rotating shaft 70 with a first columnar part 71 and a cylinder-shaped first cylindrical part 72 covering a part of a first outer circumferential surface 913 of the magnet 12, wherein the first outer circumferential surface 913 of the magnet 12 and a first inner circumferential surface 721 of the first cylin-
(Continued)

drical part 72 of the first rotating shaft 70 are joined, and a first end surface 912 of the magnet 12 and a first end surface 731 of the first rotating shaft 70 are not joined.

10 Claims, 9 Drawing Sheets

(51) Int. Cl.

| | |
|---|---|
| ***H02K 1/28*** | (2006.01) |
| ***H02K 7/04*** | (2006.01) |
| ***H02K 15/02*** | (2025.01) |
| ***H02K 15/021*** | (2025.01) |
| ***H02K 15/03*** | (2025.01) |
| ***H02K 15/16*** | (2025.01) |
| ***H02K 15/165*** | (2025.01) |
| ***H02K 21/14*** | (2006.01) |

(58) Field of Classification Search
CPC .... H02K 5/1737; H02K 15/02; H02K 15/021; H02K 15/03; H02K 15/10; H02K 15/16; H02K 15/165; H02K 21/14
See application file for complete search history.

(56) References Cited

U.S. PATENT DOCUMENTS

| | | | | |
|---|---|---|---|---|
| 5,936,324 | A | 8/1999 | Montagu | |
| 7,365,464 | B2 * | 4/2008 | Brown | H02K 7/083 310/156.31 |
| 7,830,058 | B2 * | 11/2010 | Maeda | H02K 15/03 310/156.28 |
| 8,569,920 | B2 * | 10/2013 | Ramon | H02K 5/1672 310/156.08 |
| 9,800,108 | B2 * | 10/2017 | Ramdane | H02K 1/2726 |
| 9,991,773 | B2 * | 6/2018 | Benner, Jr. | H02K 33/16 |
| 2008/0111435 | A1 | 5/2008 | Maeda | |
| 2010/0272591 | A1 | 10/2010 | Kjaer et al. | |
| 2011/0304234 | A1 | 12/2011 | Ramon et al. | |

FOREIGN PATENT DOCUMENTS

| | | | | | |
|---|---|---|---|---|---|
| JP | S62-119182 | U | | 7/1987 | |
| JP | H02-123939 | A | | 5/1990 | |
| JP | H02-241339 | A | | 9/1990 | |
| JP | H04-183238 | A | | 6/1992 | |
| JP | H06-205554 | A | | 7/1994 | |
| JP | H09-019093 | A | | 1/1997 | |
| JP | 3072851 | B2 | * | 8/2000 | |
| JP | 2004-254394 | A | | 9/2004 | |
| JP | 3814173 | B2 | | 8/2006 | |
| JP | 4400425 | B2 | * | 1/2010 | H02K 15/03 |
| JP | 2011-041371 | A | | 2/2011 | |
| JP | 2015-195702 | A | | 11/2015 | |
| JP | 6238880 | B2 | * | 11/2017 | H02K 15/03 |
| JP | 2020-005427 | A | | 1/2020 | |
| KR | 20210023152 | A | * | 3/2021 | H02K 1/28 |
| WO | 2006/051934 | A1 | | 5/2006 | |
| WO | WO-2016009770 | A1 | * | 1/2016 | H02K 15/16 |

OTHER PUBLICATIONS

Nov. 9, 2021 Office Action issued in Japanese Patent Application No. 2020-214473.
Mar. 15, 2022 Office Action issued in Japanese Patent Application No. 2020-214473.
Nov. 9, 2021 Office Action issued in Japanese Patent Application No. 2020-215519.
Mar. 15, 2022 Office Action issued in Japanese Patent Application No. 2020-215519.
May 27, 2024 Extended European Search Report issued in European Patent Application No. 21910867.7.

* cited by examiner

ROTOR, BRUSHLESS MOTOR, AND METHOD FOR MANUFACTURING ROTOR

TECHNICAL FIELD

The present invention relates to a rotor, a brushless motor, and a method for manufacturing the rotor.

BACKGROUND ART

Conventionally, brushless motors that can be downsized while obtaining the desired rotational force have been proposed.

For example, Patent Document 1 describes a brushless motor, in which a rotor made of a permanent magnet rotates when an electric current is passed through a coil wound around a field core, with a configuration integrally attaching holding bodies, each having a rotating shaft provided in a protruding manner on one end surface, to both end surfaces of the columnar rotor. Then, the holding body is bonded to each of both end surfaces of the columnar rotor.

In the configuration described in Patent Document 1, the rotational force is improved, and the characteristics of the motor are improved as compared to the case using a cylindrical rotor made of a permanent magnet with a hole through which a rotating shaft penetrates.

In addition, the holding bodies in Patent Document 1 are integrally attached to both end surfaces of the rotor by crimping both end portions of the sleeve to the end surfaces of the holding bodies inserted into the sleeve together with the cylindrical rotor.

CITATION LIST

Patent Literature

Patent Document 1: Japanese Utility Model Application Laid-Open Publication No. 62-119182

SUMMARY OF INVENTION

Technical Problem

In the case where an adhesive agent is applied to both end surfaces of a cylindrical magnet to bond a rotating shaft, there is a possibility that the thickness of the adhesive agent or an air reservoir causes the rotation shaft to be inclined and deteriorates the rotor balance. In addition, in the case where the rotating shaft is joined to both end surfaces of the columnar magnet by adhesion or welding, there is also a possibility that the rotation shaft is inclined and the rotor balance deteriorates by the thickness of the adhesive agent or welding distortion.

An object of the present invention is to provide a rotor, etc. that can suppress deterioration of a rotor balance even though the motor characteristics are improved.

In addition, in the case where dimensional variations or assembly errors among the components constituting the rotor such as the rotating shaft, the magnet, and the magnet case that covers the outer circumferential surface of the magnet increase, there is a risk that the deflection and the amount of imbalance of the rotor increase, and the vibration increases. Immediately after the rotor is assembled, even though the deflection or the amount of imbalance is small, especially when the rotor is rotated at high speed, there is a possibility that deformation, breakage, misregistration, etc. occur in the components as the rotor rotates, and the vibration increases.

An object of the present invention is to provide a rotor, etc. that can suppress vibrations.

Solution to Problem

The present invention completed under the above object provides a rotor rotatable around a predetermined centerline, including: a columnar magnet; and a rotating shaft with a shaft part and a cylindrical part, wherein an outer circumferential surface of the magnet and an inner circumferential surface of the cylindrical part of the rotating shaft are joined, and an end surface of the magnet in a direction of the centerline and an end surface of the rotating shaft in the direction of the centerline, which faces the end surface of the magnet, are not joined.

Here, the outer circumferential surface of the magnet and the inner circumferential surface of the cylindrical part may be bonded.

In addition, the magnet may include a concave part formed at an end portion in the direction of the centerline, the concave part being concaved as compared to a central outer circumferential surface of a central part, and the cylindrical part of the rotating shaft may be fitted over the concave part of the magnet.

Moreover, from another standpoint, the present invention provides a brushless motor including: a stator; and the rotor rotatably provided inside the stator.

Moreover, from another standpoint, the present invention provides a method for manufacturing a rotor rotatable around a predetermined centerline, the method including: a step of applying an adhesive agent on an outer circumferential surface of an end portion of a columnar magnet in a direction of the centerline; and a step of moving the magnet, on which the adhesive agent is applied, and a rotating shaft, which includes a shaft part and a cylindrical part, relative to each other in the direction of the centerline to fit the outer circumferential surface of the magnet into the cylindrical part of the rotating shaft, and thereby bonding the outer circumferential surface of the magnet and an inner circumferential surface of the cylindrical part of the rotating shaft with the adhesive agent.

Moreover, the present invention completed under the above object provides a rotor rotatable around a predetermined centerline, including: a columnar magnet; a magnet case covering at least a part of an outer circumferential surface of the magnet; and a rotating shaft with a shaft part and a cylindrical part, wherein the cylindrical part of the rotating shaft covers an outer circumferential surface of an end portion of the magnet case in a direction of the centerline.

Here, the magnet case may be press-fitted over the magnet, and may include a concave part on the outer circumferential surface of the end portion in the direction of the centerline, the concave part being concaved toward the centerline as compared to an outer circumferential surface of a central part, and the cylindrical part of the rotating shaft may be press-fitted over the concave part.

In addition, an outer circumferential surface of the concave part of the magnet case and an inner circumferential surface of the cylindrical part of the rotating shaft may be bonded.

Moreover, an end surface of the magnet in the direction of the centerline and an end surface of the rotating shaft in the direction of the centerline, which faces the end surface of the magnet, may not be joined.

In addition, the magnet case may include a case cylindrical part covering a part of the outer circumferential surface of the magnet, and a cover part covering an end surface of the magnet in the direction of the centerline.

In addition, the cover part may include a through hole.

Moreover, from another standpoint, the present invention provides a brushless motor including: a stator; and the rotor rotatably provided inside the stator.

Moreover, from another standpoint, the present invention provides a method for manufacturing a rotor rotatable around a predetermined centerline, the method including: a step of press-fitting a columnar magnet into a magnet case covering at least a part of an outer circumferential surface of the magnet; a step of performing cutting processing on an outer circumferential surface of an end portion of the magnet case in a direction of the centerline to form a concave part concaved toward the centerline as compared to an outer circumferential surface of a central part; and a step of moving the magnet case and a rotating shaft, which includes a shaft part and a cylindrical part, relative to each other in the direction of the centerline to press-fit the concave part of the magnet case into the cylindrical part of the rotating shaft.

Here, the method may further include: a step of performing, in a state where the magnet case is press-fitted over the magnet, the cutting processing on an end surface of the magnet on one side in the direction of the centerline and an end surface of the magnet case on the one side in the direction of the centerline simultaneously.

Advantageous Effects of Invention

According to the present invention, it is possible to provide a rotor, etc. that can suppress deterioration of a rotor balance even though the motor characteristics are improved.

In addition, according to the present invention, it is possible to provide a rotor, etc. that can suppress vibrations.

DESCRIPTION OF EMBODIMENTS

Hereinafter, exemplary embodiments will be described in detail with reference to attached drawings.

First Exemplary Embodiment

Figure 1:
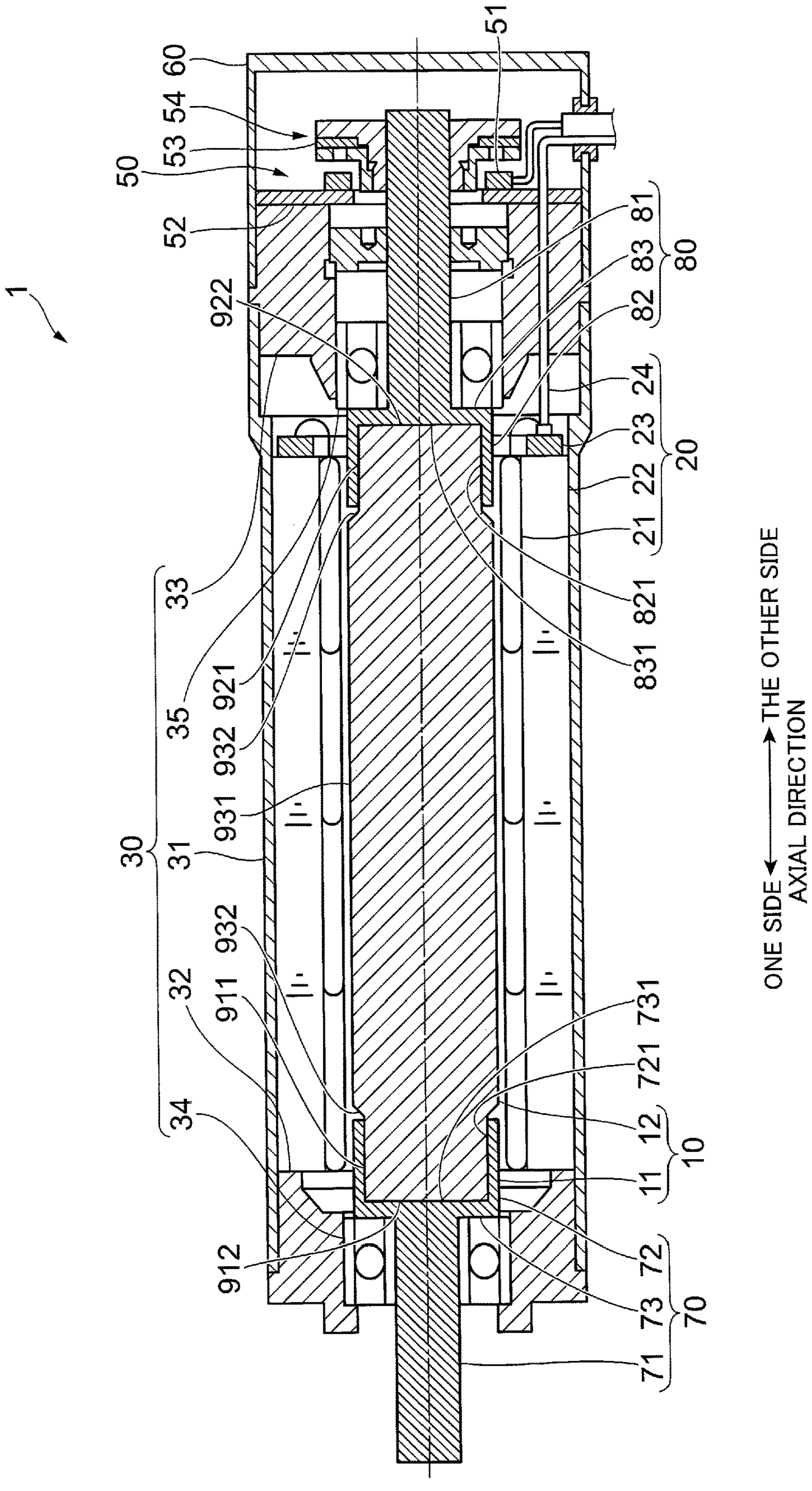
FIG. 1 is a diagram showing an example of a cross section of a brushless motor related to a first exemplary embodiment.

FIG. 1 is a diagram showing an example of a cross section of a brushless motor 1 related to the first exemplary embodiment.

Figure 2:
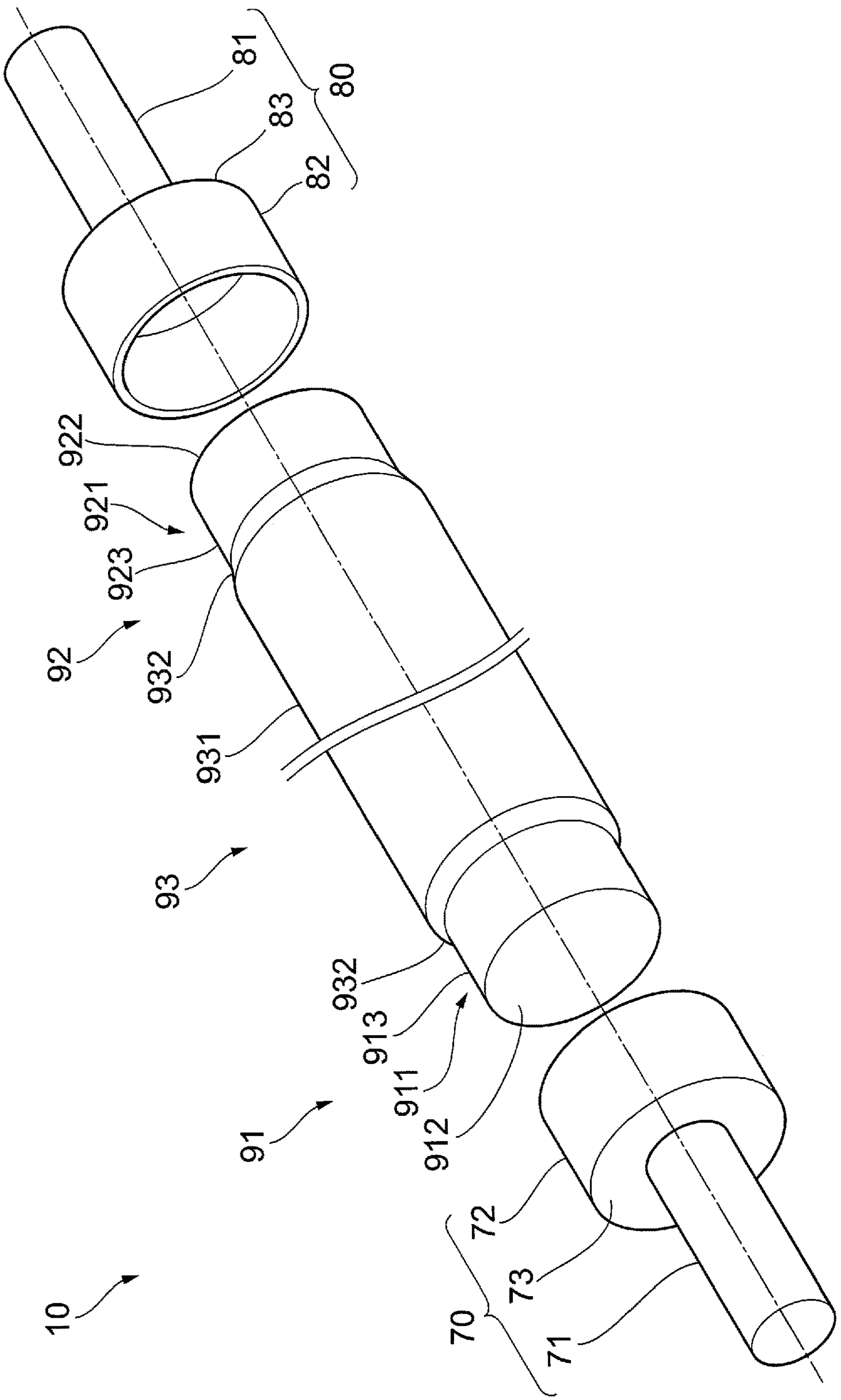
FIG. 2 is a perspective view showing an example of components constituting a rotor related to the first exemplary embodiment.

FIG. 2 is a perspective view showing an example of components constituting a rotor 10 related to the first exemplary embodiment.

The brushless motor 1 related to the exemplary embodiment includes a rotor 10, a stator 20, and a housing 30 that houses the stator 20.

The rotor 10 includes a rotating shaft 11 and a magnet 12 that rotates integrally with the rotating shaft 11. Hereinafter, the centerline direction of the rotating shaft 11 is simply referred to as an "axial direction" in some cases. In addition, in the axial direction, the left side in FIG. 1 is referred to as "one side," and the right side in FIG. 1 is referred to as "the other side" in some cases.

The rotor 10 will be described in detail later.

The stator 20 includes: a cylindrical coil 21; a cylindrical stack 22 holding the coil 21; a relay board 23 provided to an end surface on the other side of the stack 22; and a lead wire 24 connected to the relay board 23.

The housing 30 includes: a cylindrical case 31, both end portions of which in the axial direction of the rotating shaft 11 open; a first plate 32 covering the opening on one side of the case 31; and a second plate 33 covering the opening on the other side of the case 31. The housing 30 also includes: a first bearing 34 held by the first plate 32 to rotatably support an end portion on one side of the rotating shaft 11; and a second bearing 35 held by the second plate 33 to rotatably support an end portion on the other side of the rotating shaft 11.

The first plate 32 and the second plate 33 are substantially cylindrical members that hold the first bearing 34 and the second bearing 35 inside thereof, respectively, and are inserted into the case 31. The first bearing 34 and the second bearing 35 can be exemplified as a ball bearing.

In addition, the brushless motor 1 includes: a detection device 50 that is provided closer to the other side than the second bearing 35 and detects the rotation angle of the rotor 10; and a closed-end cylindrical cover 60 that covers the detection device 50.

The detection device 50 includes: a magnetic sensor 51; a sensor substrate 52 on which the magnetic sensor 51 is mounted; and a magnet unit 54 with a sensor magnet 53 provided to face the magnetic sensor 51.

(Rotor 10)

The rotating shaft 11 includes: a first rotating shaft 70 attached to an end portion on the one side of the magnet 12; and a second rotating shaft 80 attached to an end portion on the other side of the magnet 12.

The first rotating shaft 70 includes: a column-shaped first columnar part 71 provided on the one side; and a cylinder-shaped first cylindrical part 72 provided closer to the other side than the first columnar part 71. The first rotating shaft 70 also includes a first connection part 73 that connects the first columnar part 71 and the first cylindrical part 72.

The second rotating shaft 80 includes: a column-shaped second columnar part 81 provided on the other side; and a cylinder-shaped second cylindrical part 82 provided closer to the one side than the second columnar part 81. The second rotating shaft 80 also includes a second connection part 83 that connects the second columnar part 81 and the second cylindrical part 82.

In the magnet 12, a first concave part 911, which is concaved as compared to a central outer circumferential surface 931 of a central part 93, is formed at a first end portion 91, which is an end portion on the one side in the axial direction. In addition, in the magnet 12, a second concave part 921, which is concaved as compared to the central outer circumferential surface 931 of the central part 93, is formed at a second end portion 92, which is an end portion on the other side in the axial direction. Moreover, in the magnet 12, a chamfer 932 is formed at each of both end portions of the central part 93 in the axial direction.

The magnet 12 is shaped by performing cutting processing for the first concave part 911 and the second concave part 921, performing cutting processing for a first end surface 912 of the first end portion 91 and a second end surface 922 of the second end portion 92, and performing cutting processing for the chamfers 932 on a columnar material with a lathe.

A first outer circumferential surface 913 of the first concave part 911 is parallel to the axial direction, and the diameter of the first outer circumferential surface 913 is smaller than the diameter of the central outer circumferential surface 931 of the central part 93. In addition, the second outer circumferential surface 923 of the second concave part 921 is parallel to the axial direction, and the diameter of the second outer circumferential surface 923 is smaller than the diameter of the central outer circumferential surface 931 of the central part 93. It can be exemplified that the diameter of the first outer circumferential surface 913 of the first concave part 911 and the diameter of the second outer circumferential surface 923 of the second concave part 921 are the same.

The diameter of the outer circumferential surface of the first columnar part 71 of the first rotating shaft 70 is smaller than the diameter of the first outer circumferential surface 913 of the first concave part 911 in the magnet 12, and the diameter of a first inner circumferential surface 721 of the first cylindrical part 72 of the first rotating shaft 70 is slightly larger than the diameter of the first outer circumferential surface 913 of the first concave part 911 in the magnet 12. Then, the first rotating shaft 70 is assembled to the magnet 12 so that the first cylindrical part 72 covers part of the first outer circumferential surface 913 of the first concave part 911 in the magnet 12, and the first end surface 731 of the first connection part 73 is in contact with the first end surface 912 of the magnet 12. In other words, the first cylindrical part 72 of the first rotating shaft 70 and the first concave part 911 of the magnet are fitted.

When the first rotating shaft 70 and the magnet 12 are assembled, the first rotating shaft 70 and the magnet 12 are moved relative to each other in the axial direction in the state where the adhesive agent is applied on the first outer circumferential surface 913 of the first concave part 911 in the magnet 12. For example, the first rotating shaft 70 is moved from the one side to the other side in the axial direction with respect to the magnet 12. The adhesive agent is then present at a gap between the first inner circumferential surface 721 of the first cylindrical part 72 of the first rotating shaft 70 and the first outer circumferential surface 913 of the first concave part 911 of the magnet 12, to thereby bond the first rotating shaft 70 and the magnet 12. In addition, part of the adhesive agent moves from the one side to the other side in the axial direction as the first rotating shaft 70 and the magnet 12 are moved relative to each other, and moves to a gap between a tip end portion of the first cylindrical part 72 and an end portion on the one side of the central part 93 or the chamfer 932. The adhesive agent moved into the gap is removed as needed, for example, by wiping.

The diameter of the outer circumferential surface of the second columnar part 81 of the second rotating shaft 80 is smaller than the diameter of the second outer circumferential surface 923 of the second concave part 921 in the magnet 12, and the diameter of a second inner circumferential surface 821 of the second cylindrical part 82 of the second rotating shaft is slightly larger than the diameter of the second outer circumferential surface 923 of the second concave part 921 in the magnet 12. Then, the second rotating shaft 80 is assembled to the magnet 12 so that the second cylindrical part 82 covers part of the second outer circumferential surface 923 of the second concave part 921 in the magnet 12, and the second end surface 831 of the second connection part 83 is in contact with the end surface on the other side of the magnet 12. In other words, the second cylindrical part 82 of the second rotating shaft 80 and the second concave part 921 of the magnet are fitted.

When the second rotating shaft 80 and the magnet 12 are assembled, the second rotating shaft 80 and the magnet 12 are moved relative to each other in the axial direction in the state where the adhesive agent is applied on the second outer circumferential surface 923 of the second concave part 921 in the magnet 12. For example, the second rotating shaft 80 is moved from the other side to the one side in the axial direction with respect to the magnet 12. The adhesive agent is then present at a gap between the second inner circumferential surface 821 of the second cylindrical part 82 of the second rotating shaft 80 and the second outer circumferential surface 923 of the second concave part 921 of the magnet 12, to thereby bond the second rotating shaft 80 and the magnet 12. In addition, part of the adhesive agent moves from the other side to the one side in the axial direction as the second rotating shaft 80 and the magnet 12 are moved relative to each other, and moves to a gap between a tip end portion of the second cylindrical part 82 and an end portion or the chamfer 932 on the other side of the central part 93. The adhesive agent moved into the gap is removed as needed, for example, by wiping.

The brushless motor 1 configured as described above includes the stator 20 and the rotor 10 rotatably provided inside the stator 20. The rotor 10 then includes the columnar magnet 12, and the rotating shaft 11 with a shaft part (for example, the first columnar part 71) and a cylinder-shaped cylindrical part (for example, the first cylindrical part 72) that covers part of the outer circumferential surface of the magnet 12 (for example, the first outer circumferential surface 913). Then, in the rotor 10, the outer circumferential surface of the magnet 12 (for example, the first outer circumferential surface 913) and an inner circumferential surface (for example, the first inner circumferential surface 721) of the cylindrical part of the rotating shaft 11 (for example, the first cylindrical part 72) are joined, and the end surface (for example, the first end surface 912) of the magnet 12 in the axial direction and the end surface of the rotating shaft 11 in the axial direction, which is an end surface (for example, the first end surface 731) facing the end surface (for example, the first end surface 912) of the magnet 12 in the axial direction, are not joined. Therefore, the center of the rotating shaft 11 and the centerline of the magnet 12 coincide with ease. As a result, for example, as compared to the case in which the end surface (for example, the first end surface 912) of the magnet 12 in the axial direction and the end surface of the rotating shaft 11 in the axial direction, which is an end surface (for example, the first end surface 731) facing the end surface (for example, the first end surface 912) of the magnet 12 in the axial direction, are joined with the adhesive agent, deterioration of the balance of the rotor 10 around the rotating shaft can be suppressed.

Then, in the brushless motor 1 related to the exemplary embodiment, the outer circumferential surface (for example, the first outer circumferential surface 913) of the magnet 12 and the inner circumferential surface (for example, the first inner circumferential surface 721) of the cylindrical part (for example, the first cylindrical part 72) of the rotating shaft 11 are bonded. In this way, bonding the magnet 12 and the rotating shaft 11 makes it easier for the magnet 12 and the rotating shaft 11 to rotate in one piece. In addition, by bonding the magnet 12 and the rotating shaft 11 using the adhesive agent, the magnet 12 and the rotating shaft 11 can be easily integrated.

Note that the method of joining the magnet 12 and the rotating shaft 11 is not limited to bonding. For example, the magnet 12 and the rotating shaft 11 may be adhered to each other. The magnet 12 and the rotating shaft 11 may also be welded.

In addition to joining the magnet 12 and the rotating shaft 11 by bonding, adhesion, welding, etc. in this manner, the magnet 12 (for example, the first outer circumference surface 913) and the rotating shaft 11 (for example, the first inner circumference surface 721) may be fixed by press fitting.

Moreover, in the magnet 12, a concave part (for example, the first concave part 911) concaved as compared to the central outer circumferential surface 931 of the central part 93 is formed at the end portion (for example, the first end portion 91) of the rotating shaft 11 in the axial direction, and the cylindrical part (for example, the first cylindrical part 72) of the rotating shaft 11 is fitted over the concave part (for example, the first concave part 911) of the magnet 12. This makes it possible to reduce an air gap between the outer circumferential surface (for example, the central outer circumferential surface 931) of the magnet 12 and the coil 21 of the stator 20, as compared to, for example, the configuration in which the cylindrical part (for example, the first cylindrical part 72) of the rotating shaft 11 is fitted over a magnet with no concave part formed at the end portions in the axial direction. As a result, the magnetic flux density of the air gap can be increased; thereby the rotation performance of the brushless motor 1 can be improved.

Note that the outer diameter of the central outer circumferential surface 931 of the central part 93 of the magnet 12 and the outer diameters of the outer circumferential surfaces of the first cylindrical part 72 and the second cylindrical part 82 of the rotating shaft 11 should be the same. This makes it possible to reduce an air gap between the central outer circumferential surface (for example, the central outer circumferential surface 931) of the magnet 12 and the coil 21 of the stator 20, as compared to, for example, the case in which the diameters of the outer circumferential surfaces of the first cylindrical part 72 and the second cylindrical part 82 of the rotating shaft 11 are larger than the diameter of the central outer circumferential surface 931 of the central part 93 of the magnet 12. On the other hand, for example, in the case where the diameters of the outer circumferential surfaces of the first cylindrical part 72 and the second cylindrical part 82 of the rotating shaft 11 are smaller than the diameter of the central outer circumferential surface 931 of the central part 93 of the magnet 12, and the thicknesses of the first cylindrical part 72 and the second cylindrical part 82 are the same, it is possible to reduce an air gap between the first outer circumferential surface 913 of the first concave part 911, the second outer circumferential surface 923 of the second concave part 921 and the coil 21. As a result, the magnetic flux density of the air gap can be increased; thereby the rotation performance of the brushless motor 1 can be improved.

In addition, the first columnar part 71 of the first rotating shaft 70 and the second columnar part 81 of the second rotating shaft 80 of the rotating shaft 11, which are rotatably supported by the first bearing 34 and the second bearing 35, respectively, are not limited to the columnar part. For example, the first columnar part 71 and the second columnar part 81 may be cylindrical.

In addition, fitting between the first cylindrical part 72 of the first rotating shaft 70 and the first concave part 911 of the magnet 12 is not limited to a clearance fit, and the fitting may be a transition fit or an interference fit. Similarly, fitting between the second cylindrical part 82 of the second rotating shaft 80 and the second concave part 921 of the magnet 12 is not limited to the clearance fit, and the fitting may be the transition fit or the interference fit. FIG. 3 is a diagram showing an example of the method for manufacturing the rotor 10.

Figure 3A:
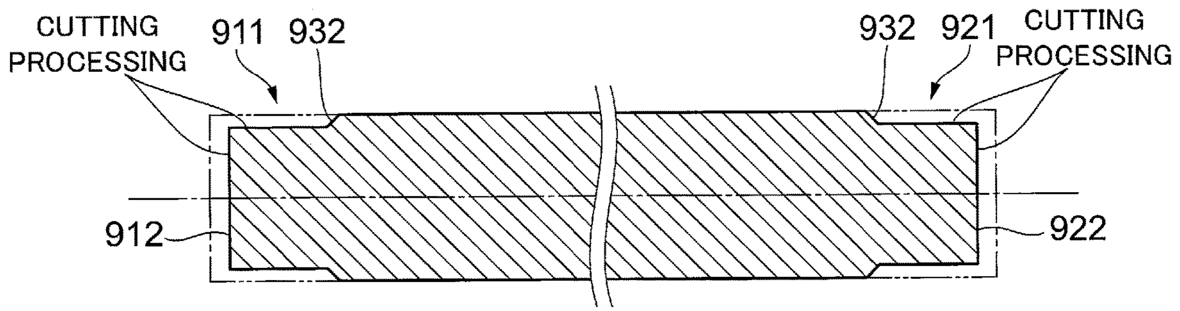
FIG. 3 is a diagram showing an example of a method for manufacturing the rotor.

First, as shown in FIG. 3A, a columnar material of the magnet 12 is subjected to cutting processing with a lathe to shape the first concave part 911 and the second concave part 921, the first end surface 912 and the second end surface 922, and the chamfers 932.

Figure 3B:
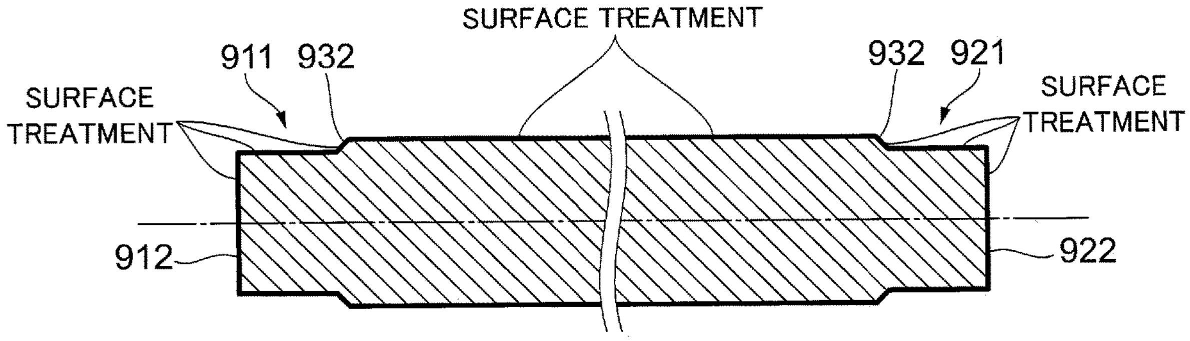

Next, as shown in FIG. 3B, to prevent rust on the entire surface of the magnet 12, which includes the first concave part 911 and the second concave part 921, the first end surface 912 and the second end surface 922, and the chamfers 932 shaped by the cutting processing, surface treatment such as nickel plating is applied to the entire surface of the magnet 12.

Figure 3C:
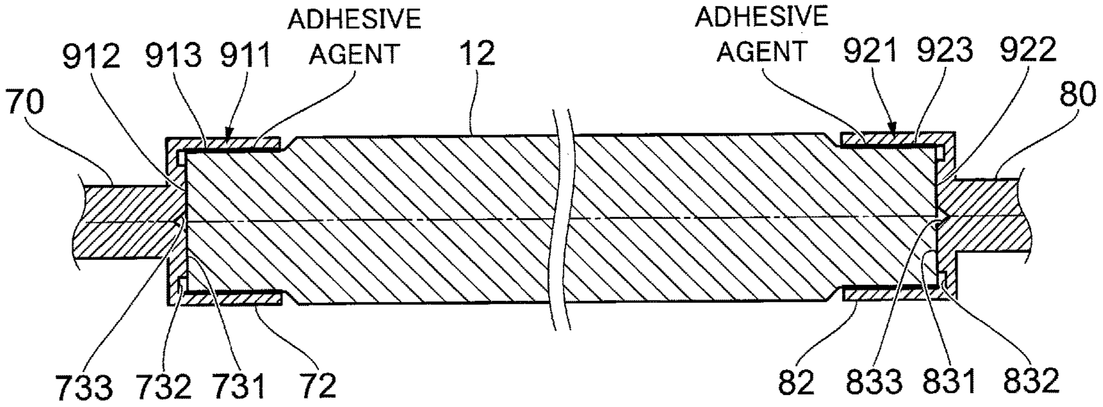

Next, as shown in FIG. 3C, the adhesive agent is applied on the first outer circumferential surface 913 of the first concave part 911 of the magnet 12, and the first cylindrical part 72 of the first rotating shaft 70 is fitted over the first concave part 911. Consequently, the magnet 12 and the first rotating shaft 70 are bonded by the adhesive agent. In addition, the adhesive agent is applied on the second outer circumferential surface 923 of the second concave part 921 of the magnet 12, and the second cylindrical part 82 of the second rotating shaft 80 is fitted over the second concave part 921. Consequently, the magnet 12 and the second rotating shaft 80 are bonded by the adhesive agent.

Note that the position where the adhesive agent is applied may be on the first inner circumferential surface 721 of the first cylindrical part 72 of the first rotating shaft 70; however, if the adhesive agent is applied to the position, when the first cylindrical part 72 of the first rotating shaft 70 is fitted over the magnet 12, there is a risk that the adhesive agent adheres to the end surface 912 of the magnet 12; accordingly, the position where the adhesive agent is applied is preferably on the first outer circumferential surface 913 of the first concave part 911 of the magnet 12, as described above.

As aforementioned, the manufacturing method of the rotor 10 includes a step of performing the cutting processing on the end portion of the columnar magnet 12 in the centerline direction to form the concave part (for example, the first concave part 911) concaved as compared to the central outer circumferential surface 931 of the central part 93. The manufacturing method of the rotor 10 also includes a step of applying the adhesive agent on the concave part (for example, the first concave part 911), and a step of moving the magnet 12, on which the adhesive agent has been applied, relative to the rotating shaft (for example, the first rotating shaft 70) in the centerline direction to fit the cylindrical part (for example, the first cylindrical part 72) over the concave part (for example, the first concave part 911).

Note that, in the first rotating shaft 70, an outer concave part 732, which is concaved from the first end surface 731, is formed at an outer circumferential part on the first end surface 731 of the first connection part 73. Due to surface treatment such as nickel plating applied to the magnet 12, the outer concave part 732 is shaped to prevent a convex part protruding in the axial direction from the first end surface 912 shaped at an intersecting part of the first end surface 912 and the first outer circumferential surface 913 of the magnet 12 from contacting the first end surface 731 of the first rotating shaft 70. Similarly, in the second rotating shaft 80, an outer concave part 832, which is concaved from the second end surface 831, is formed at an outer circumferential part on the second end surface 831 of the second connection part 83.

In addition, in the first rotating shaft 70, a central concave part 733 concaved from the first end surface 731 is formed at the central part of the first end surface 731 of the first connection part 73. Due to the first end surface 912 of the magnet 12 being formed by cutting processing with the lathe, the central concave part 733 is shaped to prevent a convex part protruding in the axial direction from the central part of the first end surface 912 formed at the first end surface 912 from contacting the first end surface 731 of the first rotating shaft 70. Similarly, in the second rotating shaft 80, a central concave part 833 concaved from the second end surface 831 is formed at the central part of the second end surface 831 of the second connection part 83.

In addition, the chamfers 932 of the magnet 12 are shaped to prevent the magnets 12 from being damaged even though the magnets contact with each other when the magnets 12 subjected to the cutting processing are transported for the surface treatment, or during application of the surface treatment. However, the chamfers 932 do not have to be shaped.

Second Exemplary Embodiment

Figure 4:
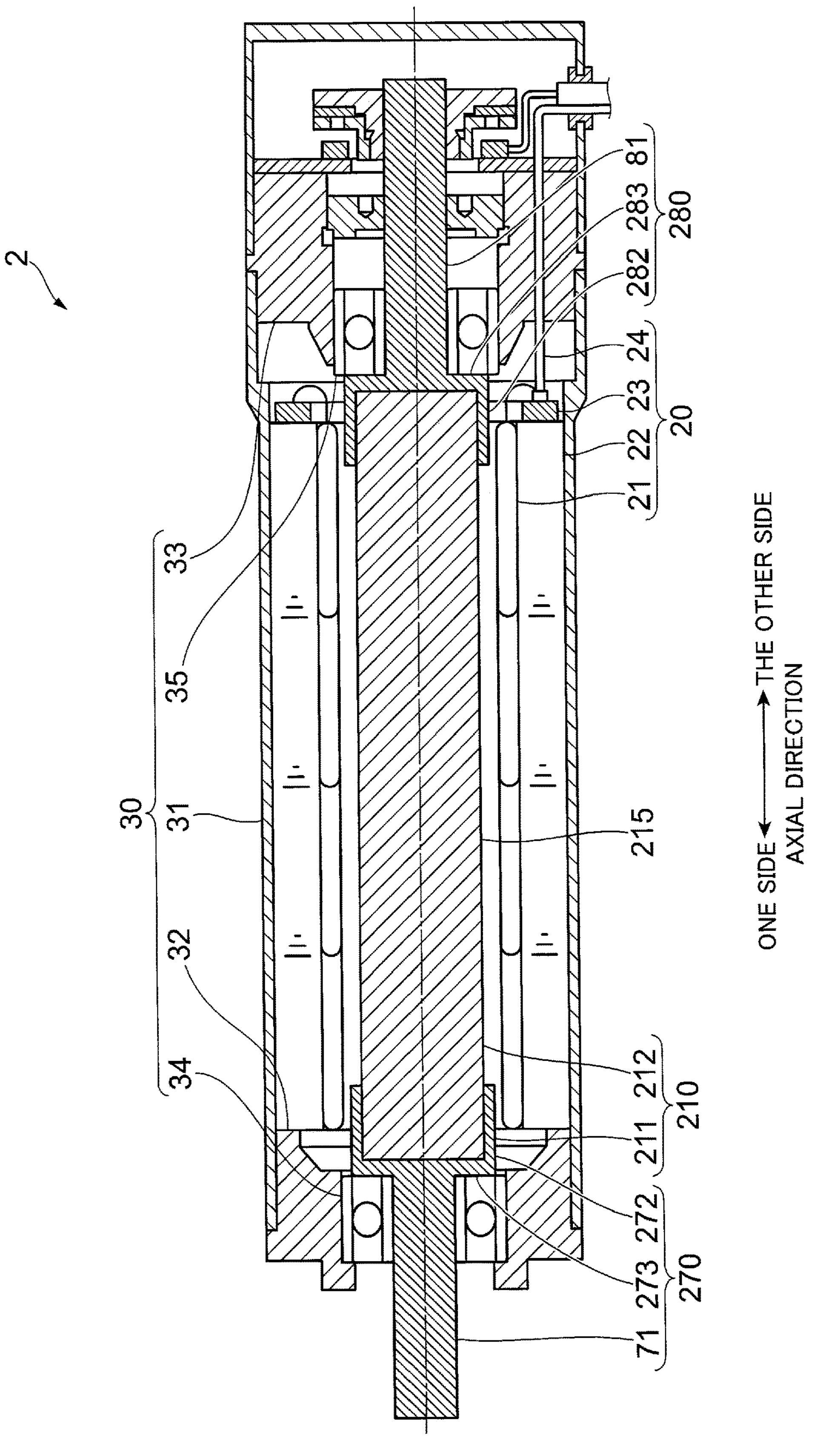
FIG. 4 is a diagram showing an example of a cross section of a brushless motor related to a second exemplary embodiment.

FIG. 4 is a diagram showing an example of a cross section of a brushless motor 2 related to the second exemplary embodiment.

The brushless motor 2 related to the second exemplary embodiment is different in a rotor 210, which corresponds to the rotor 10, from the brushless motor 1 related to the first exemplary embodiment. Hereinafter, description will be given to the points that are different from the first exemplary embodiment. In the first and second exemplary embodiments, the same reference signs will be used for the components having the same shape and functions, and detailed descriptions thereof will be omitted.

The rotor 210 related to the second exemplary embodiment includes a rotating shaft 211 and a magnet 212 that rotates integrally with the rotating shaft 211.

Unlike the magnet 12 related to the first exemplary embodiment, the magnet 212 is purely cylindrical, in which the first concave part 911 and the second concave part 921 are not formed. Therefore, the diameter of the outer circumferential surface 215 of the magnet 212 is the same from an end portion on the one side to an end portion on the other side in the axial direction.

The rotating shaft 211 includes: a first rotating shaft 270 attached to an end portion on the one side of the magnet 212; and a second rotating shaft 280 attached to an end portion on the other side of the magnet 212.

The first rotating shaft 270 includes: a first columnar part 71; and a cylinder-shaped first cylindrical part 272 provided closer to the other side than the first columnar part 71.

The first rotating shaft 270 also includes a first connection part 273 that connects the first columnar part 71 and the first cylindrical part 272.

The first cylindrical part 272 is fitted over the end portion on the one side of the magnet 212, and bonded to the magnet 212 with an adhesive agent. Since the first concave part 911 is not formed in the magnet 212, the first rotating shaft 270 differs from the first rotating shaft 70 related to the first exemplary embodiment in that the diameter of the outer circumferential surface of the first cylindrical part 272 is larger than the diameter of the outer circumferential surface 215 (including the outer circumferential surface of the central part) of the magnet 212.

The second rotating shaft 280 includes: a second columnar part 81; and a cylinder-shaped second cylindrical part 282 provided closer to the one side than the second columnar part 81. The second rotating shaft 280 also includes a second connection part 283 that connects the second columnar part 81 and the second cylindrical part 282.

The second cylindrical part 282 is fitted over the end portion on the other side of the magnet 212, and bonded to the magnet 212 with the adhesive agent. Since the second concave part 921 is not formed in the magnet 212, the second rotating shaft 280 differs from the second rotating shaft 80 related to the first exemplary embodiment in that the diameter of the outer circumferential surface of the second cylindrical part 282 is larger than the diameter of the outer circumferential surface 215 (including the outer circumferential surface of the central part) of the magnet 212.

The brushless motor 2 configured as described above includes the stator 20 and the rotor 210 rotatably provided inside the stator 20. The rotor 210 then includes the columnar magnet 212, and the rotating shaft 211 with a shaft part (for example, the first columnar part 71) and a cylinder-shaped cylindrical part (for example, the first cylindrical part 272) that covers part of the outer circumferential surface 215 of the magnet 212. Then, in the rotor 210, the outer circumferential surface 215 of the magnet 212 and an inner circumferential surface of the cylindrical part (for example, the first cylindrical part 272) of the rotating shaft 211 are joined, and the end surface of the magnet 212 in the axial direction and the end surface of the rotating shaft 211 in the axial direction, which is an end surface (for example, the end surface on the other side of the first connection part 273) facing the end surface of the magnet 212 in the axial direction, are not joined. Therefore, the center of the rotating shaft 211 and the centerline of the magnet 212 coincide with ease. As a result, for example, as compared to the configuration in which the end surface of the magnet 212 in the axial direction and the end surface of the rotating shaft 211 in the axial direction, which is an end surface (for example, the end surface on the other side of the first connection part 273) facing the end surface of the magnet 212 in the axial direction, are joined with the adhesive agent, deterioration of the balance of the rotor 210 around the rotating shaft can be suppressed.

Third Exemplary Embodiment

Figure 5:
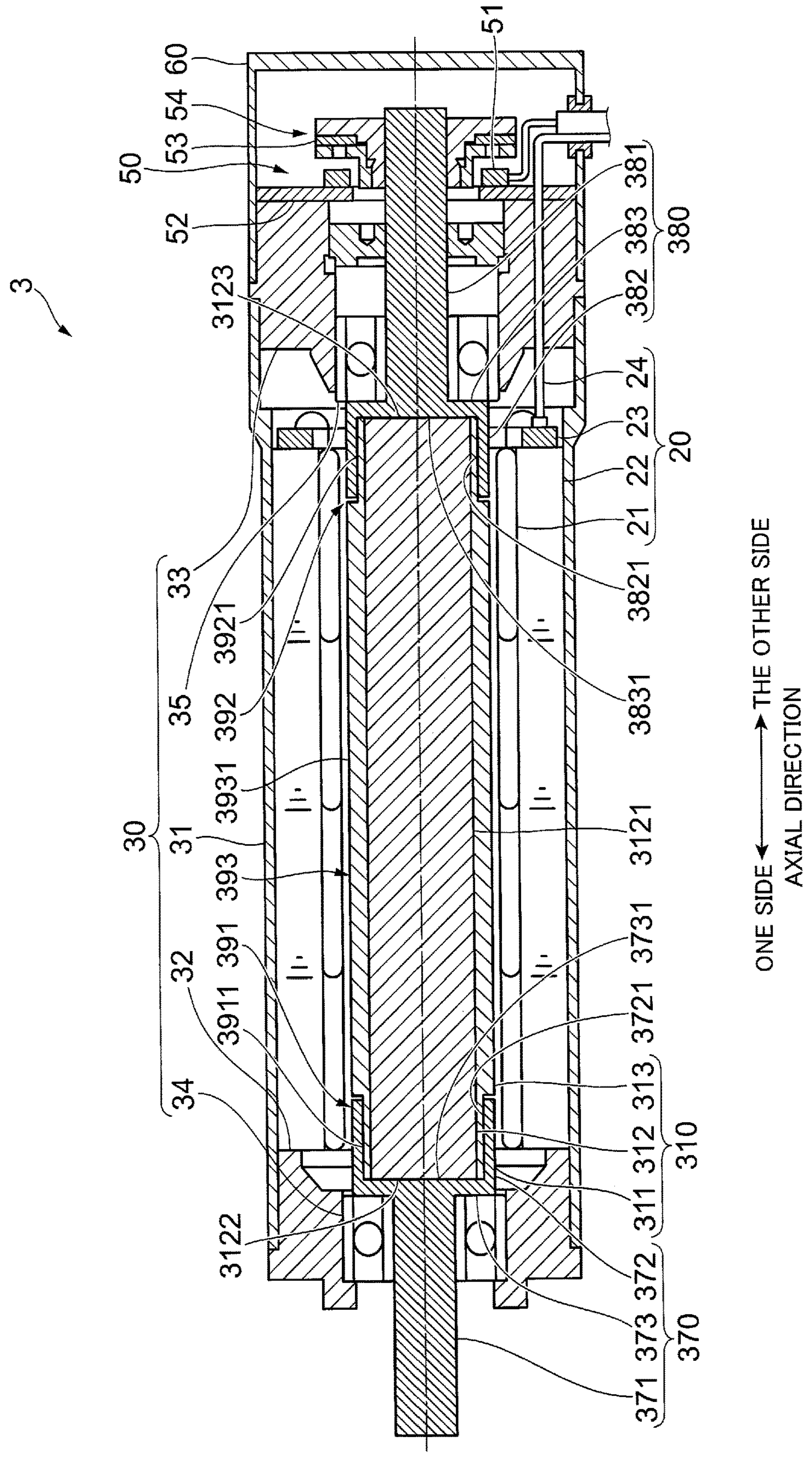
FIG. 5 is a diagram showing an example of a cross section of a brushless motor related to a third exemplary embodiment.

FIG. 5 is a diagram showing an example of a cross section of a brushless motor 3 related to the third exemplary embodiment.

Figure 6:
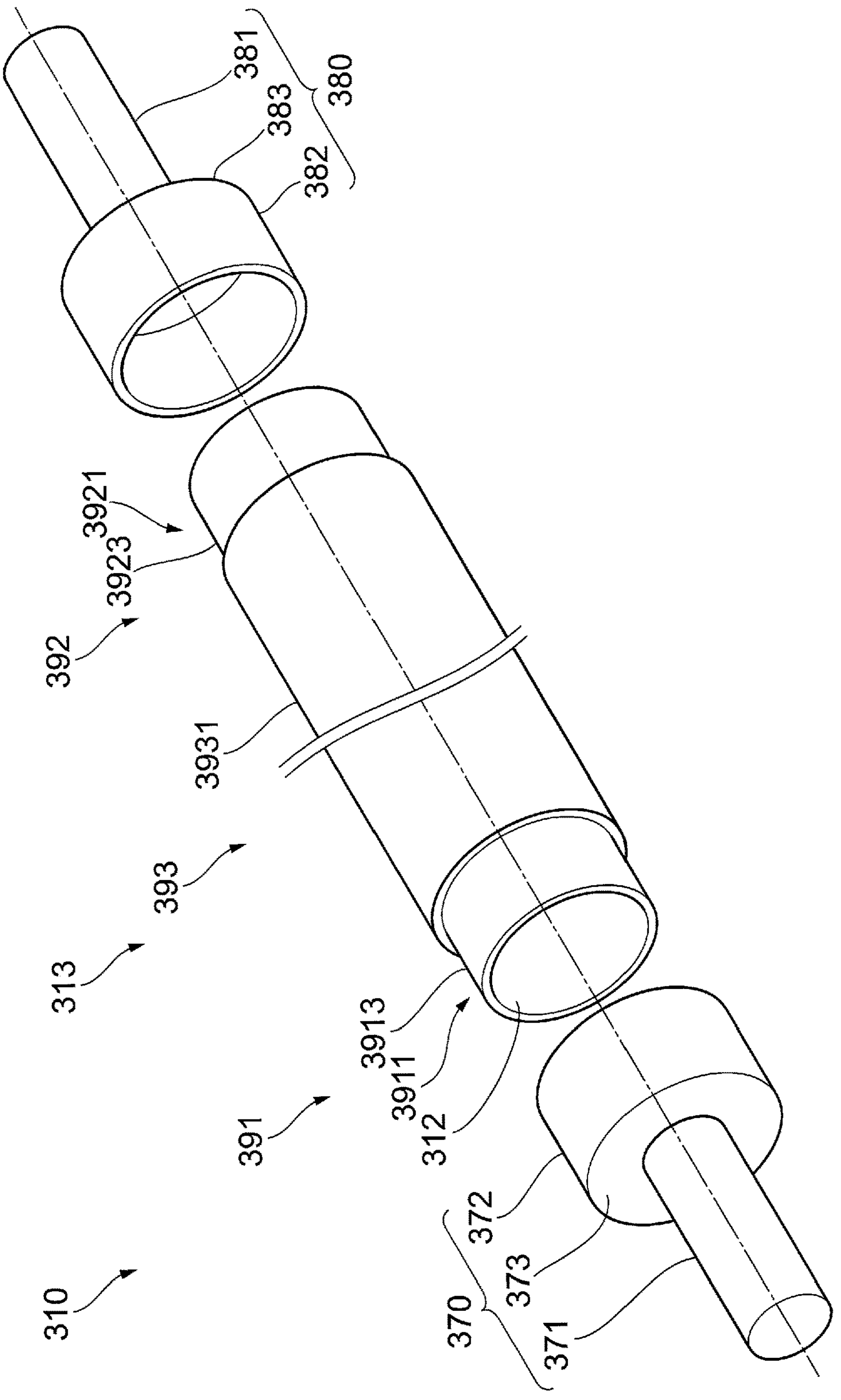
FIG. 6 is a perspective view showing an example of components constituting a rotor related to the third exemplary embodiment.

FIG. 6 is a perspective view showing an example of components constituting a rotor 310 related to the third exemplary embodiment.

The brushless motor 3 related to the exemplary embodiment includes the rotor 310, the stator 20, and a housing 30 that houses the stator 20.

The rotor 310 includes a rotating shaft 311, a columnar magnet 312, and a cylindrical magnet case 313 covering the outer circumferential surface of the magnet 312. The magnet case 313 is press-fitted over the magnet 312, and the rotating shaft 311 is press-fitted over the magnet case 313. Hereinafter, the centerline direction of the rotating shaft 311 is simply referred to as an "axial direction" in some cases. In addition, in the axial direction, the left side in FIG. 5 is referred to as "one side," and the right side in FIG. 5 is referred to as "the other side" in some cases.

The rotor 310 will be described in detail later.

The stator 20 includes: a cylindrical coil 21; a cylindrical stack 22 holding the coil 21; a relay board 23 provided to an end surface on the other side of the stack 22; and a lead wire 24 connected to the relay board 23.

The housing 30 includes: a cylindrical case 31, both end portions of which in the axial direction of the rotating shaft 311 open; a first plate 32 covering the opening on one side in the case 31; and a second plate 33 covering the opening on the other side in the case 31. The housing 30 also includes: a first bearing 34 held by the first plate 32 to rotatably support an end portion on the one side of the rotating shaft 311; and a second bearing 35 rotatably supporting an end portion on the other side of the rotating shaft 311.

The first plate 32 and the second plate 33 are substantially cylindrical members that hold the first bearing 34 and the second bearing 35 inside thereof, respectively, and are inserted into the case 31. The first bearing 34 and the second bearing 35 can be exemplified as a ball bearing.

In addition, the brushless motor 3 includes: the detection device 50 that is provided closer to the other side than the second bearing 35 and detects the rotation angle of the rotor 310; and the closed-end cylindrical cover 60 that covers the detection device 50.

The detection device 50 includes: a magnetic sensor 51; a sensor substrate 52 on which the magnetic sensor 51 is mounted; and a magnet unit 54 with a sensor magnet 53 provided to face the magnetic sensor 51.

(Rotor 310)

The rotating shaft 311 includes: a first rotating shaft 370 press-fitted over an end portion on the one side of the magnet case 313; and a second rotating shaft 380 press-fitted over an end portion on the other side of the magnet case 313.

The first rotating shaft 370 includes: a column-shaped first columnar part 371 provided on the one side; and a cylinder-shaped first cylindrical part 372 provided closer to the other side than the first columnar part 371. The first rotating shaft 370 also includes a first connection part 373 that connects the first columnar part 371 and the first cylindrical part 372.

The second rotating shaft 380 includes: a columnar-shaped second columnar part 381 provided on the other side; and a cylinder-shaped second cylindrical part 382 provided closer to the one side than the second columnar part 381. The second rotating shaft 380 also includes a second connection part 383 that connects the second columnar part 381 and the second cylindrical part 382.

In the magnet case 313, a first concave part 3911 is formed at a first end portion 391, which is an end portion on the one side in the axial direction. The first concave part 3911 is concaved as compared to a central outer circumferential surface 3931 of a central part 393. In addition, in the magnet case 313, a second concave part 3921 is formed at a second end portion 392, which is an end portion on the other side in the axial direction. The second concave part 3921 is concaved as compared to the central outer circumferential surface 3931 of the central part 393.

The magnet case 313 is shaped by performing cutting processing for the first concave part 3911 and the second concave part 3921 on a cylindrical material with a lathe.

A first outer circumferential surface 3913 of the first concave part 3911 is a surface parallel to the axial direction, and the diameter of the first outer circumferential surface 3913 is smaller than the diameter of the central outer circumferential surface 3931 of the central part 393. In addition, the second outer circumferential surface 3923 of the second concave part 3921 is a surface parallel to the axial direction, and the diameter of the second outer circumferential surface 3923 is smaller than the diameter of the central outer circumferential surface 3931 of the central part 393. It can be exemplified that the diameter of the first outer circumferential surface 3913 of the first concave part 3911 and the diameter of the second outer circumferential surface 3923 of the second concave part 3921 are the same.

The diameter of the outer circumferential surface of the first columnar part 371 of the first rotating shaft 370 is smaller than the diameter of the first outer circumferential surface 3913 of the first concave part 3911 of the magnet case 313. In addition, before the first cylindrical part 372 is press-fitted over the magnet case 313, the diameter of the first inner circumference surface 3721 of the first cylindrical part 372 of the first rotating shaft 370 is slightly smaller than the diameter of the first outer circumferential surface 3913 of the first concave part 3911 of the magnet case 313. The first cylindrical part 372 is then fitted over the magnet case 313 with an interference fit. However, the first cylindrical part 372 may be fitted over the magnet case 313 with a transition fit. Then, the first rotating shaft 370 is assembled to the magnet case 313 so that the first cylindrical part 372 covers part of the first outer circumferential surface 3913 of the first concave part 3911 in the magnet case 313, and the first end surface 3731 of the first connection part 373 is in contact with the first end surface 3122 of the magnet 312 and an end surface on the one side of the magnet case 313. The first end surface 3731 of the first connection part 373 of the first rotating shaft 370 is not joined to the first end surface 3122 of the magnet 312 and the end surface on the one side of the magnet case 313 by bonding, adhesion, welding, etc.

When the first rotating shaft 370 and the magnet case 313 are assembled, in the state where the adhesive agent is applied on the first outer circumferential surface 3913 of the first concave part 3911 in the magnet case 313, the first rotating shaft 370 and the magnet case 313 are moved relative to each other in the axial direction. For example, the first rotating shaft 370 is moved from the one side to the other side in the axial direction with respect to the magnet case 313. The adhesive agent is then present between the first inner circumferential surface 3721 of the first cylindrical part 372 of the first rotating shaft 370 and the first outer circumferential surface 3913 of the first concave part 3911 of the magnet case 313, to thereby bond the first rotating shaft 370 and the magnet case 313. In addition, part of the adhesive agent moves from the one side to the other side in the axial direction as the first rotating shaft 370 and the magnet case 313 are moved relative to each other, and moves to a gap between a tip end portion of the first cylindrical part 372 and an end portion on the one side of the central part 393. The adhesive agent moved into the gap is removed as needed, for example, by wiping.

The diameter of the outer circumferential surface of the second columnar part 381 of the second rotating shaft 380 is smaller than the diameter of the second outer circumferential surface 3923 of the second concave part 3921 of the magnet case 313. In addition, before the second cylindrical part 382 is press-fitted over the magnet case 313, the diameter of the second inner circumferential surface 3821 of the second cylindrical part 382 of the second rotating shaft 380 is slightly smaller than the diameter of the second outer circumferential surface 3923 of the second concave part 3921 of the magnet case 313. The second cylindrical part 382 is then fitted over the magnet case 313 with the interference fit. However, the second cylindrical part 382 may be fitted over the magnet case 313 with the transition fit. Then, the second rotating shaft 380 is assembled to the magnet case 313 so that the second cylindrical part 382 covers part of the second outer circumferential surface 3923 of the second concave part 3921 in the magnet case 313. The second end surface 3831 of the second connection part 383 of the second rotating shaft 380 and the end surface on the other side of the magnet case 313 are not joined to the second end surface 3123 of the magnet 312 and the end surface on the other side of the magnet case 313 by bonding, adhesion, welding, etc.

When the second rotating shaft 380 and the magnet case 313 are assembled, in the state where the adhesive agent is applied on the second outer circumferential surface 3923 of the second concave part 3921 in the magnet case 313, the second rotating shaft 380 and the magnet case 313 are moved relative to each other in the axial direction. For example, the second rotating shaft 380 is moved from the other side to the one side in the axial direction with respect to the magnet case 313. The adhesive agent is then present between the second inner circumferential surface 3821 of the second cylindrical part 382 of the second rotating shaft 380 and the second outer circumferential surface 3923 of the second concave part 3921 of the magnet case 313, to thereby bond the second rotating shaft 380 and the magnet case 313. In addition, part of the adhesive agent moves from the other side to the one side in the axial direction as the second rotating shaft 380 and the magnet case 313 are moved relative to each other, and moves to a gap between a tip end portion of the second cylindrical part 382 and an end portion on the other side of the central part 393. The adhesive agent moved into the gap is removed as needed, for example, by wiping.

The brushless motor 3 configured as described above includes the stator 20 and the rotor 310 rotatably provided inside the stator 20. The rotor 310 then includes: the columnar magnet 312; the magnet case 313 covering at least part of the outer circumferential surface of the magnet 312; and the rotating shaft 311 with a shaft part (for example, the first columnar part 371) and a cylinder-shaped cylindrical part (for example, the first cylindrical part 372) that covers part of the outer circumferential surface of the magnet case 313. The magnet case 313 is fitted over the magnet 312, and includes a concave part (for example, the first concave part 3911) at the end portion of the magnet 312 in the centerline direction, which is concaved toward the centerline as compared to the central part. The cylindrical part (for example, the first cylindrical part 372) of the rotating shaft 311 is press-fitted over the concave part (for example, the first concave part 3911) of the magnet case 313. In this manner, since the magnet case 313 is press-fitted over the magnet 312 and the rotating shaft 311 is press-fitted over the concave part (for example, the first concave part 3911) of the magnet case 313, dimensional variations or assembly errors among the components are reduced, and thereby the centerline of the rotating shaft 311 (the center of the rotation) and the centerline of the magnet 312 (the center of the rotation) coincide with ease. As a result, according to the brushless motor 3, the deflection and the amount of imbalance of the rotor 310 are reduced; therefore, the vibration can be suppressed. In addition, it is possible to reduce an air gap between the outer circumferential surface 3121 of the magnet 312 and the coil 21 of the stator 20, as compared to, for example, the configuration in which the cylindrical part (for example, the first cylindrical part 372) of the rotating shaft 311 is fitted over a magnet case with no concave part formed at the end portions in the axial direction. As a result, the magnetic flux density of the air gap can be increased; thereby the rotation performance of the brushless motor 3 can be improved. In addition, according to the brushless motor 3, since the magnet case 313 covers at least part of the outer circumferential surface of the magnet 312, damage to magnet 312 can be suppressed even though the rotor 310 is rotated at high speed, and rust generation can be suppressed even if the surface treatment such as nickel plating is not applied to the magnet 312. Moreover, since the cylindrical part (for example, the first cylindrical part 372) of the rotating shaft 311 covers the outer circumferential surface (for example, the first outer circumferential surface 3913) of the end portion of the magnet case 313 in the axial direction, even if the rotor 310 is rotated at high speed, occurrence of vibration due to deformation, etc. of the end portion (for example, the first end portion 391) of the magnet case 313 in the axial direction can be suppressed. In addition, since the end surface (for example, the first end surface 3122) of the magnet 312 in the axial direction and the end surface (for example, the first end surface 3731) of the rotating shaft 311 in the axial direction, which faces the above end surface, are not joined, as compared to the case in which these end surfaces are joined, the inclination of the centerline of the magnet 312 with respect to the centerline of the rotating shaft 311 can be suppressed.

Then, in the brushless motor 3 related to the third exemplary embodiment, the outer circumferential surface (for example, the first outer circumferential surface 3913) of the concave part (for example, the first concave part 3911) of the magnet case 313 and the inner circumferential surface (for example, the first inner circumferential surface 3721) of the cylindrical part (for example, the first cylindrical part 372) of the rotating shaft 311 are bonded. In this way, bonding the magnet case 313 and the rotating shaft 311 makes it easier for the magnet case 313 and the rotating shaft 311 to rotate in one piece. In addition, by bonding the magnet case 313 and the rotating shaft 311 using the adhesive agent, the magnet case 313 and the rotating shaft 311 can be easily integrated.

Note that the method of joining the magnet case 313 and the rotating shaft 311 is not limited to bonding. For example, the magnet case 313 and the rotating shaft 311 may be adhered to each other. The magnet case 313 and the rotating shaft 311 may also be welded.

In addition, in the brushless motor 3 related to the third exemplary embodiment, the magnet case 313 is cylindrical and includes a concave part (for example, the first concave part 3911) at the end portion in the centerline direction. Consequently, the rotating shaft 311 can be easily press-fitted over the magnet case 313.

Note that the outer diameter of the central outer circumferential surface 3931 of the central part 393 of the magnet case 313 and the outer diameters of the outer circumferential surfaces of the first cylindrical part 372 and the second cylindrical part 382 of the rotating shaft 311 should be the same. This makes it possible to reduce an air gap between the magnet 312 and the coil 21 of the stator 20, as compared to, for example, the case in which the diameters of the outer circumferential surfaces of the first cylindrical part 372 and the second cylindrical part 382 of the rotating shaft 311 are larger than the diameter of the central outer circumferential surface 3931 of the central part 393 of the magnet case 313. As a result, the magnetic flux density of the air gap can be increased; thereby the rotation performance of the brushless motor 3 can be improved.

In addition, the first columnar part 371 of the first rotating shaft 370 and the second columnar part 381 of the second rotating shaft 380 of the rotating shaft 311, which are rotatably supported by the first bearing 34 and the second bearing 35, respectively, are not limited to the columnar part. For example, the first columnar part 371 and the second columnar part 381 may be cylindrical.

FIG. 7 is a diagram showing an example of a method for manufacturing the rotor 310 related to the third exemplary embodiment.

Figure 7A:
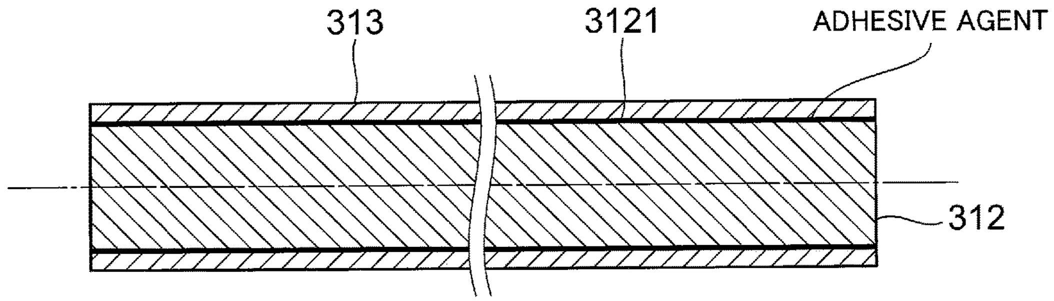
FIG. 7 is a diagram showing an example of a method for manufacturing the rotor related to the third exemplary embodiment.

First, as shown in FIG. 7A, an adhesive agent is applied on the outer circumferential surface 3121 of the columnar magnet 312, and the magnet 312 is fitted (press-fitted) into the cylindrical material of the magnet case 313 with the interference fit.

Figure 7B:
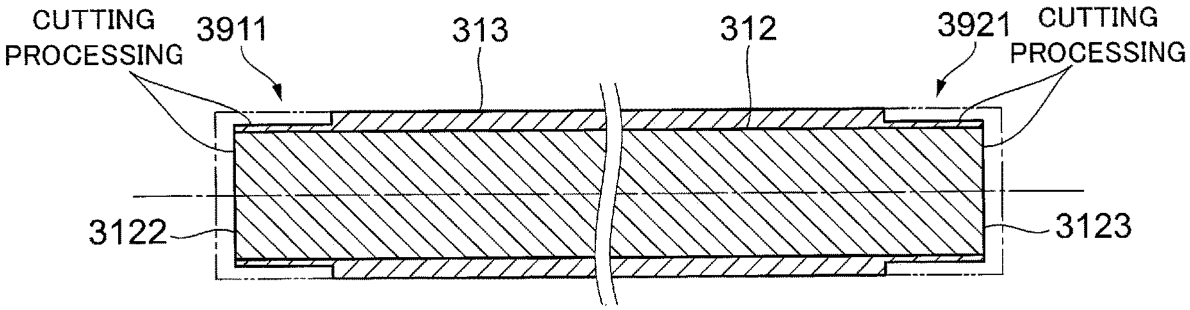

Next, as shown in FIG. 7B, the cutting processing is applied to the cylindrical material of the magnet case 313 with a lathe to shape the first concave part 3911 and the second concave part 3921. In addition, using the lathe, the cutting processing is applied to shape the first end surface 3122 and the second end surface 3123 of the magnet 312, and at the same time, the cutting processing is also applied to shape the end surface on the one side and the end surface on the other side of the magnet case 313. This accurately flattens both end surfaces of the magnet 312 and the magnet case 313 in the axial direction.

Figure 7C:
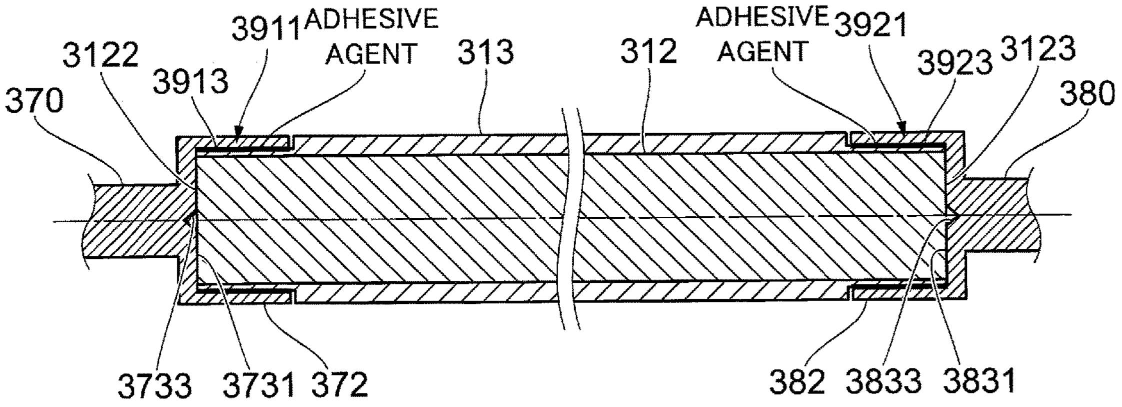

Next, as shown in FIG. 7C, the adhesive agent is applied on the first outer circumferential surface 3913 of the first concave part 3911 of the magnet case 313, and the first cylindrical part 372 of the first rotating shaft 370 is fitted (press-fitted) over the first concave part 3911 with the interference fit. Consequently, the magnet case 313 and the first rotating shaft 370 are bonded by the adhesive agent. In addition, the adhesive agent is applied on the second outer circumferential surface 3923 of the second concave part 3921 of the magnet case 313, and the second cylindrical part 382 of the second rotating shaft 380 is fitted (press-fitted) over the second concave part 3921 with the interference fit. Consequently, the magnet case 313 and the second rotating shaft 380 are bonded by the adhesive agent.

As described above, the manufacturing method of the rotor 310 includes: a step of press-fitting the magnet case 313 covering at least part of the outer circumferential surface of the magnet 312 over the columnar magnet 312; and a step of performing the cutting processing onto the end portions of the magnet case 313 in the centerline direction to form the concave parts (for example, the first concave part 3911) concaved as compared to the outer circumferential surface of the central part 393 (for example, the central outer circumferential surface 3931). The manufacturing method of the rotor 310 also includes: a step of moving the magnet case 313 and the rotating shaft 311 with the shaft part (for example, the first columnar part 371) and the cylinder-shaped cylindrical part (for example, the first cylindrical part 372) relative to each other in the centerline direction to press-fit the concave part (for example, the first concave part 3911) of the magnet case 313 into the cylindrical part (for example, the first cylindrical part 372) of the rotating shaft 311.

In this manner, since the magnet case 313 is press-fitted over the magnet 312 and the rotating shaft 311 is press-fitted over the concave part (for example, the first concave part 3911) of the magnet case 313, dimensional variations or assembly errors among the components can be reduced, and the centerline of the rotating shaft 311 (the center of the rotation) and the centerline of the magnet 312 (the center of the rotation) can coincide with ease. As a result, according to the brushless motor 3, the deflection and the amount of imbalance of the rotor 310 are reduced; therefore, the vibration can be suppressed.

Note that, in the first rotating shaft 370, a central concave part 3733, which is concaved from the first end surface 3731, is formed at the central part of the first end surface 3731 of the first connection part 373. The central concave part 3733 is shaped to prevent a convex part, which is possibly generated due to the cutting processing applied on the first end surface 3122 of the magnet 312 with the lathe, protruding in the axial direction from the central part of the first end surface 3122 from contacting the first end surface 3731. Similarly, in the second rotating shaft 380, a central concave part 3833, which is concaved from the second end surface 3831, is formed at the central part of the second end surface 3831 of the second connection part 383.

Fourth Exemplary Embodiment

Figure 8:
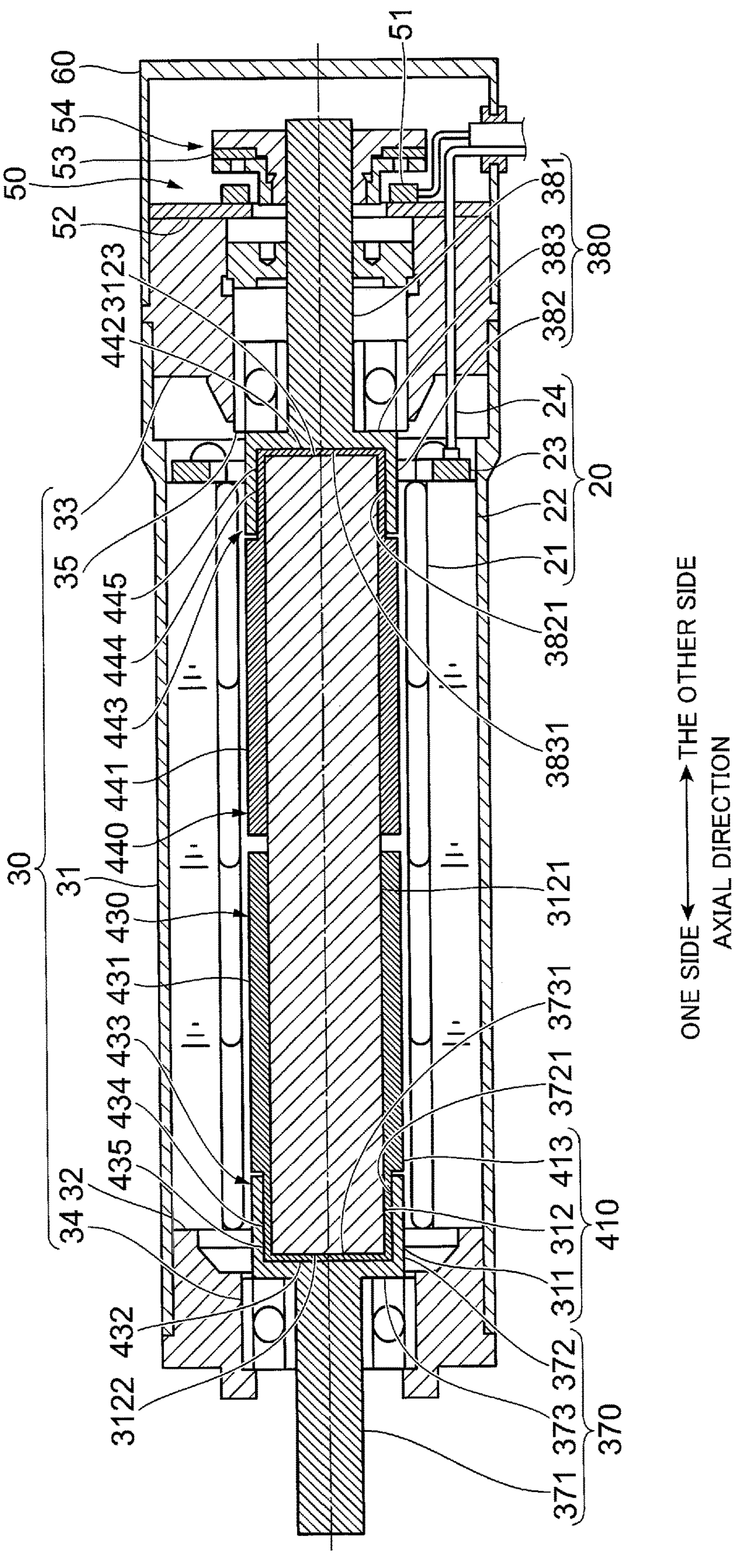
FIG. 8 is a diagram showing an example of a cross section of a brushless motor related to a fourth exemplary embodiment.

FIG. 8 is a diagram showing an example of a cross section of a brushless motor 4 related to the fourth exemplary embodiment.

The brushless motor 4 related to the fourth exemplary embodiment is different in a rotor 410, which corresponds to the rotor 310, from the brushless motor 3 related to the third exemplary embodiment. Hereinafter, description will be given to the points that are different from the third exemplary embodiment. In the third and fourth exemplary embodiments, the same reference signs will be used for the components having the same shape and functions, and detailed descriptions thereof will be omitted.

The rotor 410 related to the fourth exemplary embodiment includes the rotating shaft 311, the magnet 312, and a magnet case 413 covering part of the outer circumferential surface 3121 of the magnet 312, the first end surface 3122 and the second end surface 3123.

The magnet case 413 includes: a first case 430 press-fitted over an end portion on the one side of the magnet 312; and a second case 440 press-fitted over an end portion on the other side of the magnet 312. The first rotating shaft 370 is press-fitted over the first case 430, and the second rotating shaft 380 is press-fitted over the second case 440.

The first case 430 includes a cylinder-shaped first cylindrical part 431, and a first cover part 432 covering an opening part on the one side of the first cylindrical part 431. In the first case 430, a first concave part 434 is formed at the end portion on the one side in the axial direction, which is concaved as compared to the outer circumferential surface 433 on the other side.

The first case 430 is shaped by performing, on a closed-end cylindrical material, the cutting processing for the first concave part 434 and a surface on the one side of the first cover part 432 with a lathe.

The second case 440 includes a cylinder-shaped second cylindrical part 441, and a second cover part 442 covering an opening part on the other side of the second cylindrical part 441. In the second case 440, a second concave part 444 is formed at the end portion on the other side in the axial direction, which is concaved as compared to the outer circumferential surface 443 on the one side.

The second case 440 is shaped by performing, on a closed-end cylindrical material, the cutting processing for the second concave part 444 and a surface on the other side of the second cover part 442 with a lathe.

A first outer circumferential surface 435 of the first concave part 434 is a surface parallel to the axial direction, and the diameter of the first outer circumferential surface 435 is smaller than the diameter of the outer circumferential surface of the first cylindrical part 431, which is on the other side of the first concave part 434. In addition, the second outer circumferential surface 445 of the second concave part 444 is a surface parallel to the axial direction, and the diameter of the second outer circumferential surface 445 is smaller than the diameter of the outer circumferential surface of the second cylindrical part 441, which is on the one side of the second concave part 444. It can be exemplified that the diameter of the first outer circumferential surface 435 of the first concave part 434 and the diameter of the second outer circumferential surface 445 of the second concave part 444 are the same.

The diameter of the outer circumferential surface of the first columnar part 371 of the first rotating shaft 370 is smaller than the diameter of the first outer circumferential surface 435 of the first concave part 434 of the first case 430. In addition, before the first cylindrical part 372 is press-fitted over the first case 430, the diameter of the first inner circumferential surface 3721 of the first cylindrical part 372 of the first rotating shaft 370 is slightly smaller than the diameter of the first outer circumferential surface 435 of the first concave part 434 of the first case 430. The first cylindrical part 372 is then fitted over the first case 430 with the interference fit. However, the first cylindrical part 372 may be fitted over the first case 430 with the transition fit. Then, the first rotating shaft 370 is assembled to the first case 430 so that the first cylindrical part 372 covers part of the first outer circumferential surface 435 of the first concave part 434 of the first case 430, and the first end surface 3731 of the first connection part 373 is in contact with the end surface on the one side of the first cover part 432 of the first case 430. The first end surface 3731 of the first connection part 373 of the first rotating shaft 370 is not joined to the end surface on the one side of the first cover part 432 of the first case 430 by bonding, adhesion, welding, etc.

When the first rotating shaft 370 and the first case 430 are assembled, in the state where the adhesive agent is applied on the first outer circumferential surface 435 of the first concave part 434 of the first case 430, the first rotating shaft 370 and the first case 430 are moved relative to each other in the axial direction. For example, the first rotating shaft 370 is moved from the one side to the other side in the axial direction with respect to the first case 430. The adhesive agent is then present between the first inner circumferential surface 3721 of the first cylindrical part 372 of the first rotating shaft 370 and the first outer circumferential surface 435 of the first concave part 434 of the first case 430, to thereby bond the first rotating shaft 370 and the first case 430. In addition, part of the adhesive agent moves from the one side to the other side in the axial direction as the first rotating shaft 370 and the first case 430 are moved relative to each other, and moves to a gap between a tip end portion of the first cylindrical part 372 and an end portion on the other side of the first concave part 434 of the first case 430. The adhesive agent moved into the gap is removed as needed, for example, by wiping.

The diameter of the outer circumferential surface of the second columnar part 381 of the second rotating shaft 380 is smaller than the diameter of the second outer circumferential surface 445 of the second concave part 444 of the second case 440. In addition, before the second cylindrical part 382 is press-fitted over the second case 440, the diameter of the second inner circumference surface 3821 of the second cylindrical part 382 of the second rotating shaft 380 is slightly smaller than the diameter of the second outer circumferential surface 445 of the second concave part 444 of the second case 440. The second cylindrical part 382 is then fitted over the second case 440 with the interference fit. However, the second cylindrical part 382 may be fitted over the second case 440 with the transition fit. Then, the second rotating shaft 380 is assembled to the second case 440 so that the second cylindrical part 382 covers part of the second outer circumferential surface 445 of the second concave part 444 of the second case 440, and the second end surface 3831 of the second connection part 383 is in contact with the end surface on the other side of the second cover part 442 of the second case 440. The second end surface 3831 of the second connection part 383 of the second rotating shaft 380 is not joined to the end surface on the other side of the second cover part 442 of the second case 440 by bonding, adhesion, welding, etc.

When the second rotating shaft 380 and the second case 440 are assembled, in the state where the adhesive agent is applied on the second outer circumferential surface 445 of the second concave part 444 of the second case 440, the second rotating shaft 380 and the second case 440 are moved relative to each other in the axial direction. For example, the second rotating shaft 380 is moved from the other side to the one side in the axial direction with respect to the second case 440. The adhesive agent is then present between the second inner circumferential surface 3821 of the second cylindrical part 382 of the second rotating shaft 380 and the second outer circumferential surface 445 of the second concave part 444 of the second case 440, to thereby bond the second rotating shaft 380 and the second case 440. In addition, part of the adhesive agent moves from the other side to the one side in the axial direction as the second rotating shaft 380 and the second case 440 are moved relative to each other, and moves to a gap between a tip end portion of the second cylindrical part 382 and an end portion on the one side of the second concave part 444 of the second case 440. The adhesive agent moved into the gap is removed as needed, for example, by wiping.

The brushless motor 4 configured as described above includes the stator 20 and the rotor 410 rotatably provided inside the stator 20. The rotor 410 then includes: the columnar magnet 312; the magnet case 413 covering at least part of the outer circumferential surface of the magnet 312; and the rotating shaft 311 with a shaft part (for example, the first columnar part 371) and a cylinder-shaped cylindrical part (for example, the first cylindrical part 372) that covers part of the outer circumferential surface of the magnet case 413. The magnet case 413 is fitted over the magnet 312, and includes a concave part (for example, the first concave part 434) at the end portion of the magnet 312 in the centerline direction, which is concaved toward the centerline as compared to the central part. The cylindrical part (for example, the first cylindrical part 372) of the rotating shaft 311 is press-fitted over the concave part (for example, the first concave part 434) of the magnet case 413. In this manner, since the magnet case 413 is press-fitted over the magnet 312 and the rotating shaft 311 is press-fitted over the concave part (for example, the first concave part 434) of the magnet case 413, dimensional variations or assembly errors among the components are reduced, and thereby the centerline of the rotating shaft 311 (the center of the rotation) and the centerline of the magnet 312 (the center of the rotation) coincide with ease. As a result, according to the brushless motor 4, the deflection and the amount of imbalance of the rotor 410 are reduced; therefore, the vibration can be suppressed. In addition, it is possible to reduce an air gap between the outer circumferential surface of the magnet 312 and the coil 21 of the stator 20, as compared to, for example, the configuration in which the cylindrical part (for example, the first cylindrical part 372) of the rotating shaft 311 is fitted over a magnet case with no concave part formed at the end portions in the axial direction. As a result, the magnetic flux density of the air gap can be increased; thereby the rotation performance of the brushless motor 4 can be improved. In addition, according to the brushless motor 4, since the magnet case 413 covers at least part of the outer circumferential surface of the magnet 312, damage to magnet 312 can be suppressed even though the rotor 410 is rotated at high speed, and rust generation can be suppressed even if the surface treatment such as nickel plating is not applied to the magnet 312. Moreover, since the magnet case 413 covers the end surface (for example, the first end surface 3122) of the magnet 312 in the axial direction, the stiffness and the mechanical strength of the connection portion between the rotating shaft 311 (for example, the first rotating shaft 370) and the magnet 312 can be increased. In addition, since the cylindrical part (for example, the first cylindrical part 372) of the rotating shaft 311 covers the outer circumferential surface (for example, the first outer circumferential surface 435) of the end portion of the magnet case 413 in the axial direction, even if the rotor 410 is rotated at high speed, occurrence of vibration due to deformation, etc. of the magnet case 413 can be suppressed. In addition, since the end surface (for example, the end surface on the one side of the first cover part 432) of the magnet case 413 in the axial direction and the end surface (for example, the first end surface 3731) of the rotating shaft 311 in the axial direction, which faces the above end surface, are not joined, as compared to the case in which these end surfaces are joined, the inclination of the centerline of the magnet 312 with respect to the centerline of the rotating shaft 311 can be suppressed.

Then, the magnet case 413 includes: a cylinder-shaped case cylindrical part (for example, the first cylindrical part 431) covering part of the outer circumferential surface of the magnet 312; a cover part (for example, a first cover part 432) covering the end surface (for example, the first end surface 3122) of the magnet 312 in the centerline direction; and a concave part (for example, the first concave part 434) at a portion in the case cylindrical part (for example, the first cylindrical part 431), which is closer to the cover part (for example, the first cover part 432). Consequently, the rotating shaft 311 can be easily press-fitted over the magnet case 413.

FIG. 9 is a diagram showing an example of a method for manufacturing the rotor 410 related to the fourth exemplary embodiment.

Figure 9A:
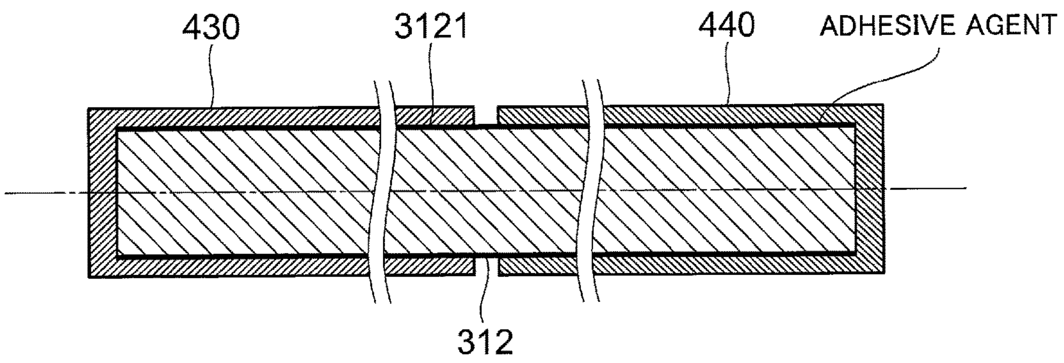
FIG. 9 is a diagram showing an example of a method for manufacturing the rotor related to the fourth exemplary embodiment.

First, as shown in FIG. 9A, an adhesive agent is applied on the outer circumferential surface 3121 of the columnar magnet 312, and the magnet 312 is fitted (press-fitted) into the material of the first case 430 and the material of the second case 440 with the interference fit.

Note that, at this time, if the air accumulated inside the first case 430 and the second case 440, which are closed-end cylindrical, prevents the magnet 312 from being fitted into the first case 430 and the second case 440, a through hole to remove the air from the inside of the first case 430 and the second case 440 may be formed in the first cover part 432 of the first case 430 and the second cover part 442 of the second case 440. It can be exemplified that the through hole has a circular shape around the centerline of the magnet 312.

Figure 9B:
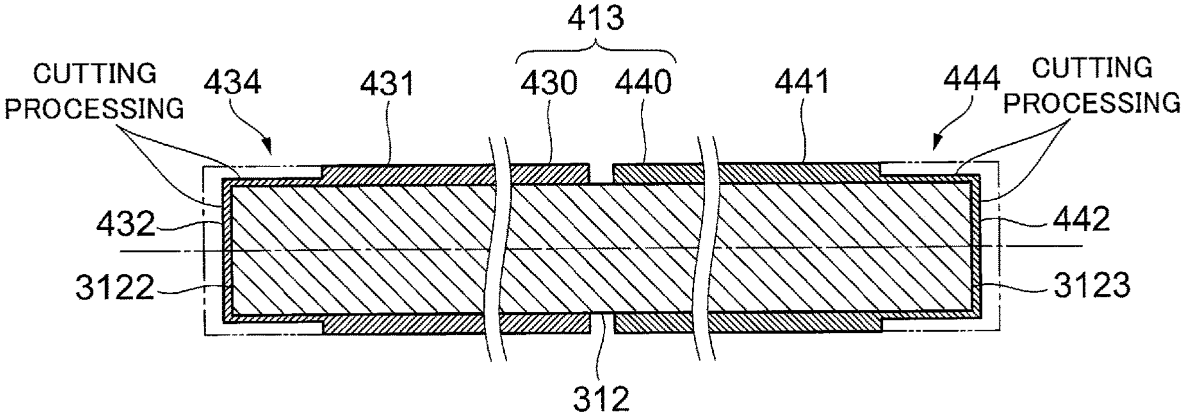

Next, as shown in FIG. 9B, the cutting processing is applied to the material of the first case 430 with a lathe, and thereby the first concave part 434 is shaped. In addition, by performing the cutting processing using the lathe, the surface on the one side of the first cover part 432 of the first case 430 is shaped. Moreover, by performing the cutting processing to the material of the second case 440 with the lathe, the second concave part 444 is shaped. In addition, by performing the cutting processing using the lathe, the surface on the other side of the second cover part 432 of the second case 440 is shaped.

Figure 9C:
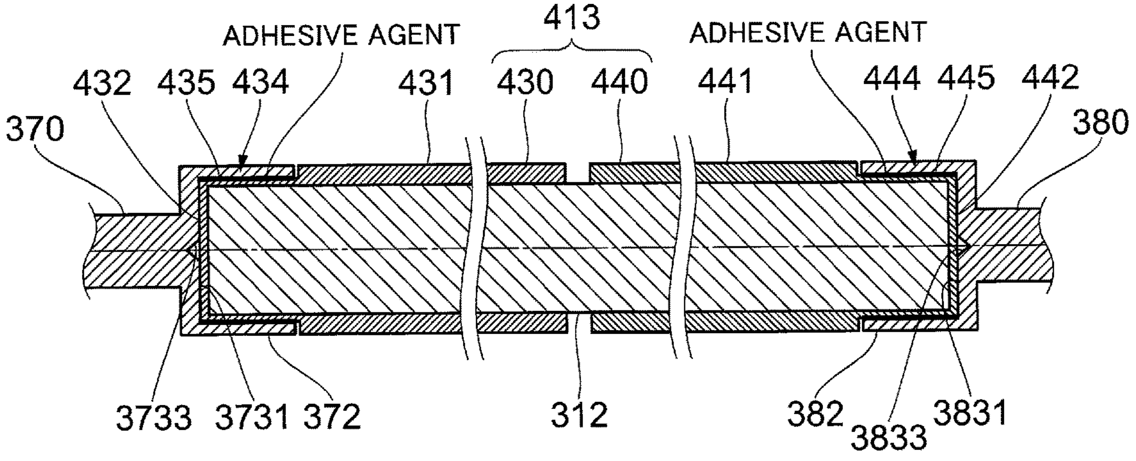

Next, as shown in FIG. 9C, the adhesive agent is applied on the first outer circumferential surface 435 of the first concave part 434 of the first case 430, and the first cylindrical part 372 of the first rotating shaft 370 is fitted (press-fitted) over the first concave part 434 with the interference fit. Consequently, the first case 430 and the first rotating shaft 370 are bonded by the adhesive agent. In addition, the adhesive agent is applied on the second outer circumferential surface 445 of the second concave part 444 of the second case 440, and the second cylindrical part 382 of the second rotating shaft 380 is fitted (press-fitted) over the second concave part 444 with the interference fit. Consequently, the second case 440 and the second rotating shaft 380 are bonded by the adhesive agent.

As described above, the manufacturing method of the rotor 410 includes: a step of press-fitting the magnet case 413 covering at least part of the outer circumferential surface of the magnet 312 over the columnar magnet 312; and a step of performing the cutting processing onto the end portion of the magnet case 413 in the centerline direction to form the concave part (for example, the first concave part 434) concaved as compared to the outer circumferential surface (for example, the outer circumferential surface 433 on the other side) of the central part. The manufacturing method of the rotor 410 also includes: a step of moving the magnet case 413 and the rotating shaft 311 with the shaft part (for example, the first columnar part 371) and the cylinder-shaped cylindrical part (for example, the first cylindrical part 372) relative to each other in the centerline direction to press-fit the concave part (for example, the first concave part 434) into the cylindrical part (for example, the first cylindrical part 372).

In this manner, since the magnet case 413 is press-fitted over the magnet 312 and the rotating shaft 311 is press-fitted over the concave part (for example, the first concave part 434) of the magnet case 413, dimensional variations or assembly errors among the components can be reduced, and the centerline of the rotating shaft 311 (the center of the rotation) and the centerline of the magnet 312 (the center of the rotation) can coincide with ease. As a result, according to the brushless motor 4, the deflection and the amount of imbalance of the rotor 410 are reduced; therefore, the vibration can be suppressed.

Note that, in the present invention, the shape of the rotor is not limited to those of the rotor 10, the rotor 210, the rotor 310, and the rotor 410; it may be other shapes.

REFERENCE SIGNS LIST

1, 2, 3, 4 Brushless motor
210, 310, 410 Rotor
11, 211, 311 Rotating shaft
12, 212, 312 Magnet
313, 413 Magnet case
20 Stator
21 Coil
30 Housing
50 Detection device
71, 371 First columnar part
72, 272, 372, 431 First cylindrical part
81, 381 Second columnar part
82, 282, 382, 441 Second cylindrical part
430 First case
432 First cover part
91, 391 First end portion
92, 392 Second end portion
93 Central part
434, 911 First concave part
435, 913 First outer circumferential surface
440 Second case
442 Second cover part
444, 921 Second concave part
445, 923 Second outer circumferential surface
931 Central outer circumferential surface

The invention claimed is:

1. A rotor rotatable around a predetermined centerline, comprising:

a columnar magnet; and a rotating shaft with a shaft part and a cylindrical part, wherein the cylindrical part of the rotating shaft covers an outer circumferential surface of an end portion of the magnet in a direction of the centerline, and the outer circumferential surface of the end portion of the magnet and an inner circumferential surface of the cylindrical part of the rotating shaft are joined by an adhesive agent, and an end surface of the magnet in the direction of the centerline and an end surface of the rotating shaft in the direction of the centerline, which faces the end surface of the magnet, are not joined.

2. The rotor according to claim 1, wherein the inner circumferential surface of the cylindrical part of the rotating shaft is press-fitted over the outer circumferential surface of the end portion of the magnet.

3. The rotor according to claim 2, wherein a concave part is formed on the outer circumferential surface of the end portion of the magnet, the concave part being concaved toward the centerline as compared to a central outer circumferential surface of the magnet, the inner circumferential surface of the cylindrical part of the rotating shaft is press-fitted over an outer circumferential surface of the concave part of the magnet, and an outer circumferential surface of the concave part of the magnet and the inner circumferential surface of the cylindrical part of the rotating shaft are joined by an adhesive agent.

4. The rotor according to claim 3, wherein a chamfer of the magnet is formed between the outer circumferential surface of the concave part of the magnet and the central outer circumferential surface of the magnet.

5. A rotor rotatable around a predetermined centerline, comprising:

a columnar magnet;

a magnet case covering at least a part of an outer circumferential surface of the magnet; and a rotating shaft with a shaft part and a cylindrical part, wherein the cylindrical part of the rotating shaft covers an outer circumferential surface of an end portion of the magnet case in a direction of the centerline, and the outer circumferential surface of the end portion of the magnet case and an inner circumferential surface of the cylindrical part of the rotating shaft are joined by an adhesive agent, and an end surface of the magnet in the direction of the centerline, which is covered with the end portion of the magnet case, and an end surface of the rotating shaft in the direction of the centerline, which faces the end surface of the magnet, are not joined.

6. The rotor according to claim 5, wherein inner circumferential surface of the cylindrical part of the rotating shaft is press-fitted over the outer circumferential surface of the end portion of the magnet case.

7. The rotor according to claim 6, wherein a concave part is formed on an outer circumferential surface of the end portion of the magnet case, the concave part being concaved toward the centerline as compared to a central outer circumferential surface of the magnet case, the inner circumferential surface of the cylindrical part of the rotating shaft is press-fitted over an outer circumferential surface of the concave part of the magnet case, and an outer circumferential surface of the concave part of the magnet case and the inner circumferential surface of the cylindrical part of the rotating shaft are joined by an adhesive agent.

8. A rotor rotatable around a predetermined centerline, comprising:

a columnar magnet;

a magnet case covering at least a part of an outer circumferential surface of the magnet; and a rotating shaft with a shaft part and a cylindrical part, wherein the cylindrical part of the rotating shaft covers an outer circumferential surface of an end portion of the magnet case in a direction of the centerline, the magnet case includes a case cylindrical part covering an outer circumferential surface of an end portion of the magnet in the direction of the centerline, and a cover part covering an end surface of the end portion of the magnet in the direction of the centerline, and an outer circumferential surface of the case cylindrical part of the magnet case and an inner circumferential surface of the cylindrical part of the rotating shaft are joined by an adhesive agent, and an end surface of the cover part of the magnet case in the direction of the centerline and an end surface of the rotating shaft in the direction of the centerline, which faces the end surface of the cover part, are not joined.

9. The rotor according to claim 8, wherein the inner circumferential surface of the cylindrical part of the rotating shaft is press-fitted over the outer circumferential surface of the case cylindrical part of the magnet case.

10. The rotor according to claim 9, wherein a concave part is formed on the outer circumferential surface of the end portion of the magnet case, the concave part being concaved toward the centerline as compared to a central outer circumferential surface of the magnet case, the inner circumferential surface of the cylindrical part of the rotating shaft is press-fitted over an outer circumferential surface of the concave part of the magnet case, and an outer circumferential surface of the concave part of the magnet case and the inner circumferential surface of the cylindrical part of the rotating shaft are joined by an adhesive agent.

* * * * *